Oct. 6, 1970 A. SCHINDEL ET AL 3,533,032
TEMPERATURE COMPENSATED ELECTRIC MOTOR AND PRESSURE
CONTROL SERVO VALVE
Filed Sept. 23, 1968 2 Sheets-Sheet 1

INVENTORS
ARNOLD SCHINDEL,
JOHN A. CASPAR &
JOHN REEVIE

BY
ATTORNEY

INVENTORS
ARNOLD SCHINDEL,
JOHN A. CASPAR &
JOHN REEVIE

United States Patent Office 3,533,032
Patented Oct. 6, 1970

3,533,032
TEMPERATURE COMPENSATED ELECTRIC MOTOR AND PRESSURE CONTROL SERVO VALVE
Arnold Schindel, Fairlawn, and John A. Caspar, Verona, N.J., and John Reevie, Ashville, N.C., assignors to Singer-General Precision, Inc., a corporation of Delaware
Filed Sept. 23, 1968, Ser. No. 761,641
Int. Cl. H01f 7/08
U.S. Cl. 335—217                                                7 Claims

ABSTRACT OF THE DISCLOSURE

An electric motor in which an armature deflects in a housing in response to an input signal which causes a magnetic field surrounding the armature to become unbalanced, and including means responsive to temperature changes for compensating for the corresponding change in flux density of the magnetic field. A pressure control servo valve adapted to control the pressure of fluid in response to the deflection of the armature.

BACKGROUND OF THE INVENTION

This invention relates to an electric motor and a servo valve operated thereby, and more particularly to such a motor and valve in which means are provided to compensate for any temperature variations that may occur during operation.

Electric motors, in the form of "torque motors" are well known, and, in general, include an electro-magnetic input coil responsive to an input signal to cause deflection of an armature disposed in a magnetic field, to operate various associated equipment. As an example of the latter, the armature can have a valve or "flapper" member fixed thereto which selectively controls the pressure differential of fluid across a pair of open conduits in a hydraulic valve system to control the reciprocating movement of a piston or spool disposed in the fluid. However, these known devices have suffered in reliability due to the fact that increases in temperature cuase the flux density of the magnetic field, and therefore the deflection of the armature, to decrease, which, of course, causes variations in the fluid pressure differential.

SUMMARY OF THE INVENTION

It is therefore an object of the present invention to provide an electric motor of the above type and a servo valve controlled thereby, which are insensitive to relatively high temperature changes.

Briefly summarized, the electric motor and servo valve of the present invention are of the same general type as described above, but utilize a spring mounting for the armature which is of a different material than the motor housing so that the spring is prestressed in response to temperature changes, which causes a reduction in its normal spring rate, to offset the above-mentioned decrease in armature deflection. Also provided is a means to apply a reluctance short across the magnetic field applied to the armature which short varies in response to the above-mentioned temperature changes, also to offset the above-mentioned decrease in armature deflection.

BRIEF DESCRIPTION OF THE DRAWINGS

Reference is now made to the accompanying drawings for a better understanding of the nature and objects of the electric motor and servo valve of the present invention, which drawings illustrate the best mode presently contemplated for carrying out the objects of the invention and its principles, and are not to be construed as restrictions or limitations on its scope. In the drawings.

DESCRIPTION OF THE PREFERRED EMBODIMENT

Figure 1:
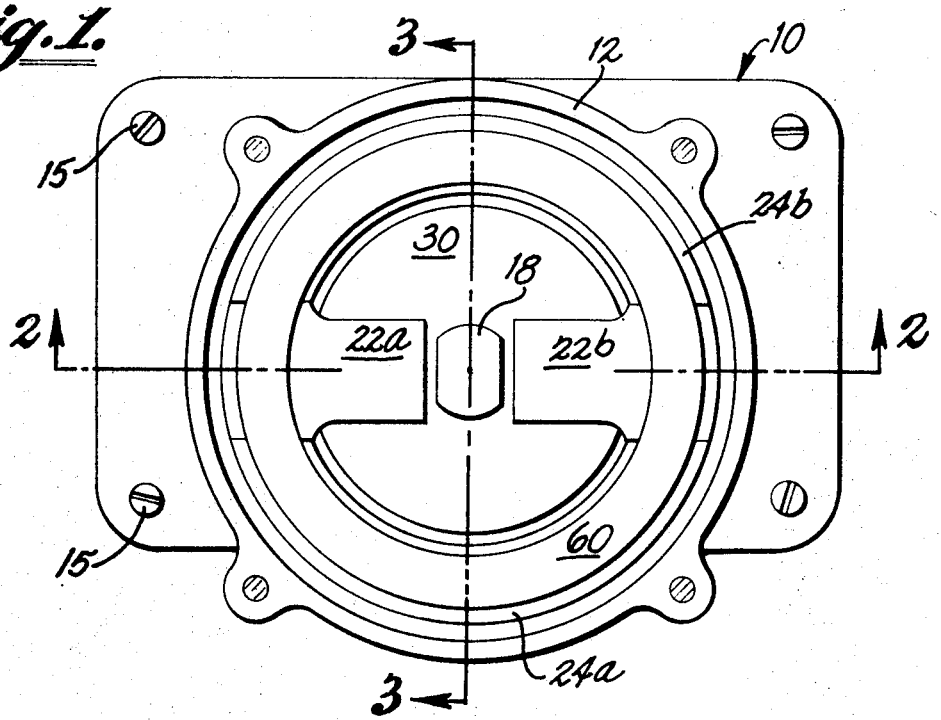
FIG. 1 is a top plan view of the device of the present invention with the cover of the housing removed.
Figure 2:
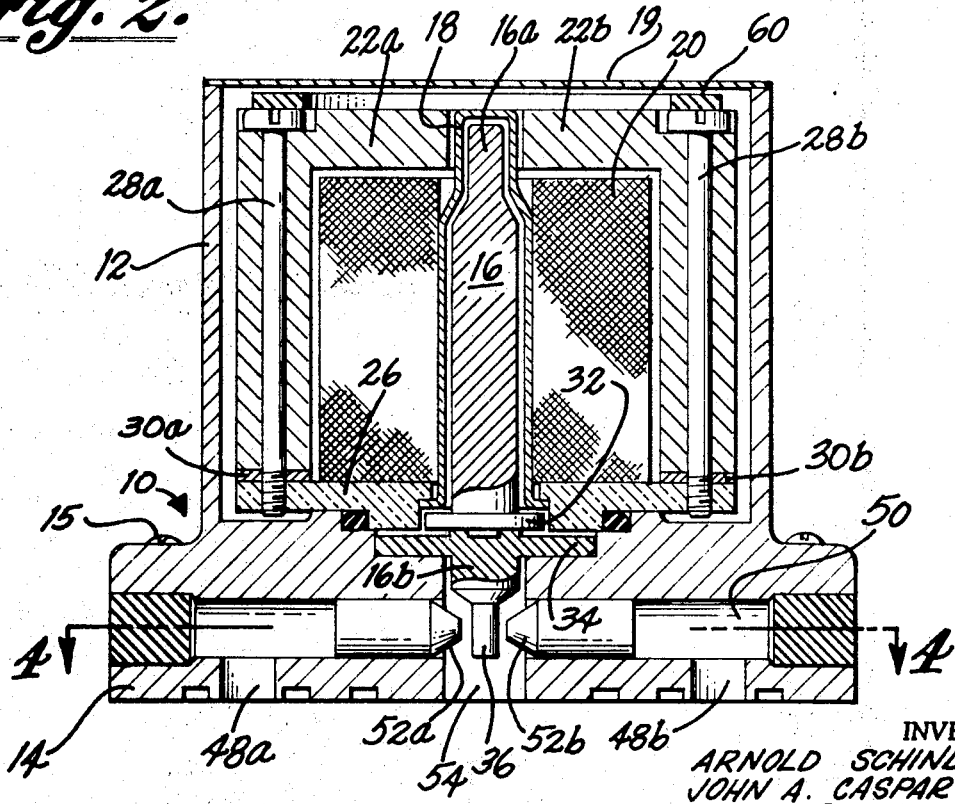
FIGS. 2 and 3 are vertical cross-sectional views taken along the lines 2—2 and 3—3, respectively, of FIG. 1.
Figure 3:
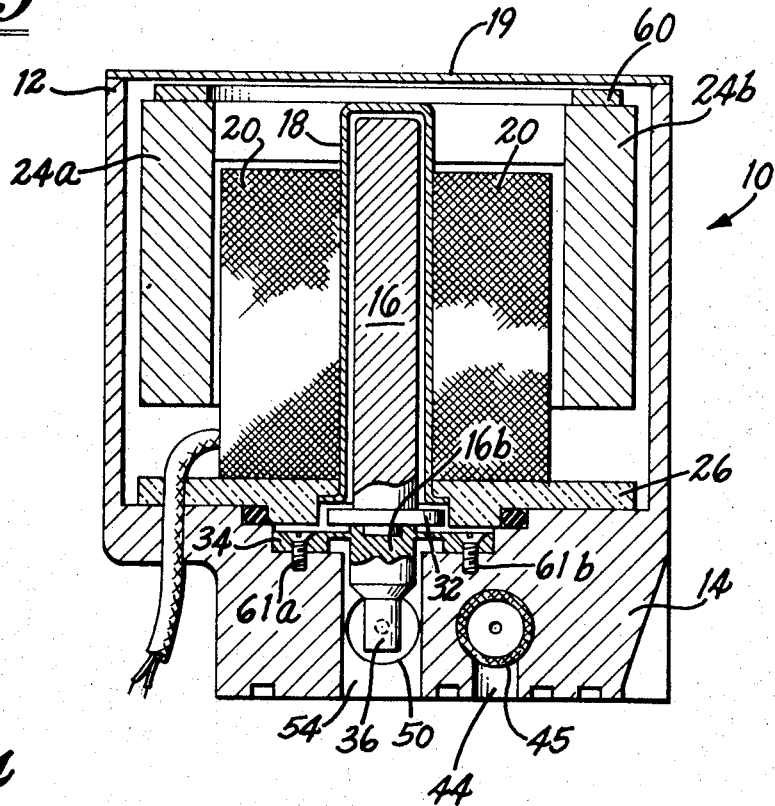

Referring specifically to FIGS. 1–3, which show the electric motor and servo valve of the present invention, the reference numeral 10 refers to a housing, which includes an annular upper portion 12 and an annular lower portion 14 which are integral and which may be held to any external system not shown) by means of a plurality of screws 15. An armature 16 is disposed centrally within the housing 10 and is mounted for deflection with respect to the housing by means that will be described in detail later. A casing or guard 18 extends over a large portion of the armature 16 as shown in FIGS. 2 and 3, and a cover 19 is provided for the housing.

An electromagnetic input coil assembly 20, comprising two wound input coils, extends around the casing 18 and is enclosed by a magnet assembly comprising a pair of pole pieces 22a and 22b, which have an L-shaped cross-section as shown in FIG. 2, and a pair of permanent magnets 24a and 24b (FIG. 3) which are arcuate shaped in top plan view as shown in FIG. 1, and which are soldered to the pole pieces 22a and 22b to form a cylinder. The magnet assembly is secured to a motor plate 26 extending around the casing 18 by means of a pair of tie down screws 28a and 28b extending through a pair of non-magnetic shims 30a and 30b, as shown in FIG. 2.

In regard to material, the housing may be of a durable light weight material, such as aluminum, and the magnets, pole pieces and armature may be of conventional nickel iron material of low hysteresis and high permeability.

It is understood that the above structure and arrangement is generally well-known in the art and the orientation of the magnets 24a and 24b and the pole pieces 22a and 22b is such that a balanced magnetic field is applied to the sides of the upper end 16a of armature 16 as shown in FIG. 2 by means of the pole pieces 22. Therefore, upon an input signal, in the form of a differential current, being applied to the coil assembly 20, a magnetic flux is set up in the armature which overcomes this balanced condition and causes the end 16a of the armature 16 to deflect to the left or right as shown in FIG. 2, depending on the direction of current.

The mounting of the armature 16 with respect to the housing 10 is one of the features of the present invention and is better shown with reference to FIGS. 2 and 3. Specifically, the armature 16 has a flange portion 32 which is mounted in a grooved portion of the upper housing member 12 and abuts a stepped portion of a diaphragm support spring 34 which has a central hole extending thereinto to accommodate the armature 16 near its lower end 16b. The spring 34 may be of a material having a low mechanical hysteresis, such as beryllium copper, and its outer peripheral portion is enlarged to accommodate a pair of screws 61a and 61b disposed in a plane lying transverse to the direction of deflection of the armature and adapted to secured the spring 34 to the upper housing member 12 as shown in FIG. 3. Thus the above-mentioned deflection of the end 16a of the armature causes a corresponding deflection of the end 16b about the pivot mounting made possible by the spring 34.

As emphasized above, it has been discovered in similar prior art devices that, upon increases in the operating temperature of such an electric motor, the flux density of the magnetic field of the magnetic assembly decreases, thus causing severe variations in the rate and degree of deflection of the armature. Therefore, according to the present invention, the lower housing member 14 is constructed of a different material than the spring, such as, for example, aluminum, so that the housing member 14 will undergo a greater thermal expansion than the spring 34 in response to any increase in temperature, and the latter will thus be pre-stressed across the screws 61a and 61b to reduce its effective mechanical spring rate. This, in turn, will at least partially off-set the above reduction of the flux density and therefore minimize variations in armature deflection, in addition to minimizing the dislocation of the individual parts in response to the above difference in thermal expansion.

According to a further feature of the present invention, a ring 60 of nickel iron material, having a lesser amount of nickel than in the armature and the pole pieces, is provided which extends around the magnet assembly and is soldered to the pole pieces 22a and 22b as shown in FIG. 2. The arrangement is such that the ring 60 acts as a thermal compensator by applying a varying reluctance short across the magnetic bridge circuit established by the magnet assembly in response to predetermined operating temperatures to maintain the flux in the working air gap at a constant value over a wide temperature range which, in turn, additionally compensates for variations in armature deflection normally caused by increased temperature.

As an example of the use of the thermal compensating ring 60, at a given room temperature the reluctance of the ring 60 can be such as to short circuit one unit of flux away from the working air gap, while at a relatively higher temperature of a magnitude that will cause a decrease of one unit of flux in the air gap, the ring is saturated and does not operate to effect a short circuit. The result is that a constant flux density is maintained in the air gap despite the increase in temperature.

It is understod that both of the above disclosed arrangements for compensating for the changes in the flux density in the working air gap due to temperature changes are independent and can therefore be used alone or together, according to the particular design and requirements of the system.

Figure 4:
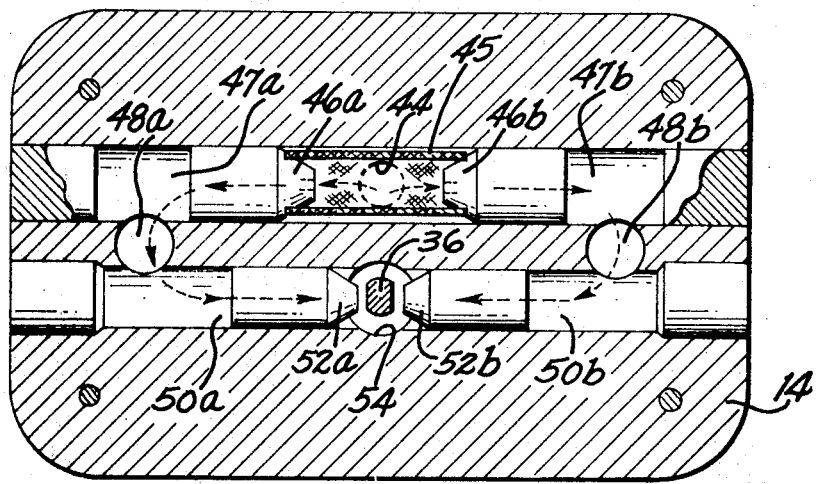
FIG. 4 is a horizontal cross-sectional view taken along the line 4—4 of FIG. 2.

It is emphasized that the above electric motor may be used in any type of environment in which it is subjected to high temperature variations. For example, it can be used to operate a pressure control servo valve, shown with reference to FIGS. 2-4. Specifically a flapper 36 may be fitted over the lower end 16b of the armature 16 and may be integral with the diaphragm support spring 34 as shown in FIGS. 2 and 3, and the upper housing member 12 and the lower housing member 14 may be machined so that they together define a hydraulic flow system as better shown with reference to FIG. 4. This latter system is such that fluid may be supplied from an external source to a supply port 44 from which it flows through a screen filter 45, fixed nozzles 46a and 46b, passages 47a and 47b, and output signal ports 48a and 48b respectively to passages 50a and 50b, respectively, as shown by the arrows in FIG. 4. The latter passages terminate in nozzles 52a and 52b, respectively, located at either side of the flapper 36 of the armature assembly. After flowing through the nozzles, and the nozzle-to-flapper space which forms a variable orifice, the fluid exits through a return port 54.

In operation of the electrical motor and servo valve of the present invention, an electrical input signal is applied to the coil assembly 20 which causes the magnetic field extending to either side of the armature 16 to become unbalanced, thereby causing a deflection of the flapper portion 36 to the right or left as viewed in FIG. 2. This at equilibrium, in turn, establishes a differential pressure across the nozzles 52a and 52b which may be detected at the output ports 48a and 48b and used to control a reciprocating member, such as a piston, spool, or the like.

Since it has been ascertained that the electric motor of the present invention can provide a reasonably constant deflection of the armature over an operating temperature range of $-10°$ F. to $+350°$ F, it is clear that a very high degree of accuracy of the servo valve, or of any other device driven by the electric motor, can be obtained.

Of course, variations of the specific construction and arrangement of the electric motor and servo valve disclosed above can be made by those skilled in the art without departing from the invention as defined in the appended claims.

We claim:

1. An electrical motor comprising a housing, an armature mounted in said housing for reciprocal movement, means establishing a balanced magnetic field around said armature, and means responsive to an input signal for unbalancing said magnetic field to cause a corresponding deflection of said armature; wherein the improvement comprises compensating means responsive to temperature changes for compensating for the variation in deflection of the armature in response to corresponding changes in flux of said magnetic field, said compensating means comprising a spring member mounting said armature in said housing, said housing being of a different material than said spring member and adapted to prestress said spring member in response to said temperature changes to vary the spring rate of said spring member.

2. The improvement of claim 1 wherein said compensating means further includes means to apply a reluctance short across said magnetic field which varies in response to said temperature changes.

3. A servo valve comprising a housing, an armature mounted in said housing for reciprocal movement, means establishing a balanced magnetic field around said armature, means responsive to an input signal for unbalancing said magnetic field to cause a corresponding deflection of said armature, a pair of oppositely arranged nozzles, means to transfer fluid under pressure to said nozzles, and a flapper valve disposed on one end of said armature and extending between said nozzles, wherein the improvement comprises compensating means responsive to temperature changes for compensating for the variation in deflection of the armature in response to corresponding changes in flux density of said magnetic field, said compensating means comprising a spring member mounting said armature in said housing, said housing being of a different material than said spring member and adapted to prestress said spring member in response to said temperature changes to vary the spring rate of said spring member.

4. The improvement of claim 3 wherein said compensating means further includes means to apply a reluctance short across said magnetic field which varies in response to said temperature changes.

5. An electromagnetic torquing motor comprising in combination:

a housing defining a substantially cylindrically shaped enclosure;

a pair of diametrically opposed, spaced pole pieces disposed in said enclosure; and, a pair of diametrically opposed spaced arcuately shaped permanent magnets disposed substantially in quadrature with said pole pieces and connected thereto to form a substantially cylindrically shaped magnetic assembly concentrically supported within said enclosure;

said pole pieces having an L-shaped cross-section respectively to form an air gap centrally of said magnetic assembly at one end thereof;

an elongated armature, said armature being pivotally mounted at one of its ends and having its other end extending into said air gap between said diametrically opposed spaced pole pieces;

means responsive to an input signal for varying the magnetic flux in said magnetic assembly whereby said armature may be caused to pivot about its said one end; and a magnetic shunt path in the form of an annular ring of magnetic material connected to the cylindrical extremity of said magnetic assembly at its said one end thereof adjacent said L-shaped pole pieces and being symmetrically disposed about the longitudinal axis of said armature when the latter is in a null position whereby said shunt path automatically compensates for the change in effective permeability of said magnetic assembly due to changes in ambient temperature.

6. The combination defined in claim 5 in which said housing has a base portion, said one end of said armature being coupled to a diaphragm support spring mounted in said housing base portion for pivotal support of said armature as hereinaforesaid, said diaphragm support spring having a temperature coefficient of expansion dissimilar to that of said housing base portion whereby an increase in ambient temperature causes a prestressing of said diaphragm support spring sufficient to decrease the effective spring rate thereof.

7. The combination defined in claim 6 wherein said housing base portion is formed of aluminum and said diaphragm support spring is formed of beryllium copper alloy.

References Cited

UNITED STATES PATENTS

| | | | |
|---|---|---|---|
| 2,794,090 | 5/1957 | Ertl et al. | 335—217 |
| 3,154,728 | 10/1964 | Bordenet | 335—234 XR |
| 3,223,104 | 12/1965 | Cox et al. | 137—625.62 XR |

GEORGE HARRIS, Primary Examiner

U.S. Cl. X.R.

335—230; 137—625.65